United States Patent
Popp et al.

(10) Patent No.: US 11,605,320 B1
(45) Date of Patent: Mar. 14, 2023

(54) RELATIVE SURFACE TRAVELLING MAP PROJECTION PROCESS

(71) Applicant: DISNEY ENTERPRISES, INC., Burbank, CA (US)

(72) Inventors: Joseph M. Popp, Cerritos, CA (US); Steven M. Chapman, Newbury Park, CA (US); Charles P. Davis, Fountain Valley, CA (US); Jeremie A. Papon, Los Angeles, CA (US); Alice J. Taylor, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/505,092

(22) Filed: Oct. 19, 2021

(51) Int. Cl.
G09G 3/00 (2006.01)
G01C 21/36 (2006.01)
G06V 20/56 (2022.01)

(52) U.S. Cl.
CPC ........... *G09G 3/001* (2013.01); *G01C 21/365* (2013.01); *G06V 20/56* (2022.01); *G09G 2320/062* (2013.01); *G09G 2360/144* (2013.01); *G09G 2380/10* (2013.01)

(58) Field of Classification Search
CPC ............. G09G 3/001; G09G 2320/062; G09G 2360/144; G09G 2380/10; G01C 21/365; G06V 20/56
See application file for complete search history.

(56) References Cited

U.S. PATENT DOCUMENTS

| | | | |
|---|---|---|---|
| 5,329,310 A | 7/1994 | Liljegren et al. | |
| 9,567,102 B1* | 2/2017 | Ross | G01C 21/365 |
| 10,025,375 B2* | 7/2018 | Lazor | G06F 3/0346 |
| 10,053,001 B1* | 8/2018 | Nabbe | B60Q 1/346 |
| 10,134,280 B1* | 11/2018 | You | B60Q 1/525 |
| 10,215,583 B2* | 2/2019 | Ng-Thow-Hing | G01C 21/3658 |
| 11,054,656 B2* | 7/2021 | Haseltine | B60K 35/00 |
| 2009/0115916 A1* | 5/2009 | Kondo | H04N 9/3185 348/E3.043 |
| 2014/0233099 A1* | 8/2014 | Stark | G09F 27/00 362/555 |
| 2015/0042640 A1* | 2/2015 | Algreatly | G06T 3/005 345/419 |
| 2016/0316184 A1* | 10/2016 | Kim | H04N 9/3161 |
| 2016/0335778 A1* | 11/2016 | Smits | G06T 7/20 |
| 2018/0086262 A1* | 3/2018 | Morel | G06V 10/60 |
| 2019/0051041 A1* | 2/2019 | Mills | E02F 9/261 |
| 2019/0052852 A1* | 2/2019 | Schick | G06T 5/006 |
| 2019/0121522 A1* | 4/2019 | Davis | G02B 27/017 |
| 2021/0264175 A1* | 8/2021 | Zhang | G06V 20/58 |

\* cited by examiner

*Primary Examiner* — Ibrahim A Khan
(74) *Attorney, Agent, or Firm* — Dorsey & Whitney LLP (57) ABSTRACT

A method to project content from a moving projector. The method includes analyzing an object to identify a projection surface; determining a first position of a projector relative to the projection surface; modifying a first frame of a content for projection onto the projection surface based on the projection surface and the first position of the projector; projecting the first frame of the content from the projector onto the projection surface; determining a second position of the projector relative to the projection surface; modifying a second frame of the content based on the projection surface and the second position; and projecting the second frame of the content from the projector onto the projection surface.

18 Claims, 8 Drawing Sheets

RELATIVE SURFACE TRAVELLING MAP PROJECTION PROCESS

FIELD

The described embodiments relate generally to systems and methods to project content on varying projection locations.

BACKGROUND

Projection systems are used in many different environments to project content, such as images, movies, and the like, onto a projection surface. Projection systems may be used to project primary content in a specific location, such as a movie in a movie theater. Additionally, projection systems may be used to project content that may supplement real-world or live action entertainment, such as projecting content that enhances motion within a theme park (e.g., with animatronic motion or projection corresponding to a location within a ride). Conventional projection systems are typically static and configured to project on a predetermined projection surface or location. While there may be some projection systems configured to project onto different surfaces or locations, these typically require that the projector itself remain in a set position, e.g., the system may use two different projectors.

In certain instances, a fixed projector in a location may not be feasible or desired, and it may be desirable to have a projection location that can be varied, along with a projector that can be moved dynamically to update the projection location. However, movement of a projector while projecting can cause multiple issues on the projection quality, content, and viewer experience. For example, the brightness of the projected content may increase as the project moves closer to the projection surface and similarly may decrease as the projector moves farther away from the projection surface. As another example, as the orientation of the project may change relative to the projection surface, the projection angle of the pixels may change, causing "blowby" as the pixels may be projected on locations past the original projection surface and may not be viewable or may be severely distorted, e.g., projection off-screen. Other issues include, varying reflectance and surface properties of the projection surface, color variation along different projection surface, etc. As such, there is a need for a mobile projection system that can accommodate and correct for varying movement of the projector.

SUMMARY

In one embodiment, a method to project content is disclosed. The method includes analyzing an object to identify a projection surface; determining a first position of a projector relative to the projection surface; modifying a first frame of a content for projection onto the projection surface based on the projection surface and a first position of the projector; projecting the first frame of the content from the projector onto the projection surface; determining a second position of the projector relative to the projection surface, where the second position is different from the first position; modifying a second frame of the content based on the projection surface and the second position, and projecting the second frame of the content from the projector onto the projection surface.

In another embodiment, a projection system is disclosed. The projection system includes a vehicle, a detector coupled to the vehicle such that movement of the vehicle moves the detector, and a projector in electrical communication with the detector and coupled to the vehicle such that movement of the vehicle moves the projector. The detector analyzes objects within an environment to identify a first projection surface on a first object and a second projection surface on a second object and the projector projects content on the first projection surface from a first location of the vehicle and projects content on the second projection surface from a second location of the vehicle, where the first and second locations are different.

In yet another embodiment, a method for projecting content along a path is disclosed. The method includes identifying a first projection surface at a first location on the path, identifying a second projection surface at a second location on the path, projecting content onto the first projection surface from a first plurality of positions of a projector on the path relative to the first location and projecting content on the second projection surface from a second plurality of positions of the projector moving on the path.

DETAILED DESCRIPTION

The systems and methods described here relate to a traveling or movable projection system. Specifically, the projector may be movable and configured to project onto one or more projection surfaces from different project locations, i.e., project while moving relative to the projection surface. The projection system accounts for variations in the projection surface and position of the projector relative to the projection surface to mitigate issues related to the movement of the projector. For example, projection characteristics, such as brightness, pixel location, color, etc. may be dynamically updated to adapt to the changes in location of the projector as well as characteristics of the projection surface. This allows the projection system to be flexible and readily modified based on different artistic features and output requirements.

In some embodiments, a projector may be positioned on a vehicle, such as a car, boat, or aircraft, and moved along a path. While moving, the projector projects content onto different projection surfaces and locations, such as building surfaces, that are viewable on the path, while also updating the content projected at a given projection location to account for distance changes as the vehicle moves toward and away from the projection surface. In some instances, a first frame of content may be projected on the first projection surface and a second frame, which may be the same content but warped in a different manner or a different frame of content altogether, may be projected at a second projection surface.

In some embodiments, the projection system may analyze properties of different surfaces to identify a projection surface, e.g., evaluate surface texture, reflectance, color, occlusions, and the like. As a specific example, the projection system can analyze surfaces of different buildings, structures, or the like to identify a position on a surface for projection. The properties may be determined by capturing images of the projection surface, utilizing structured light or light reflectance from a projected light source (e.g., laser), or similar techniques. Additionally, the projection surfaces may be analyzed to determine a distance between a projector and the projection surface, e.g., using a laser range finder or other distance estimation method. In this manner, the projection content can be warped or varied to match the projection surface and adapt in light of the changing position of the projector relative to the projection surface. In some instances, the projection surface may also detect motion of the projector relative to the projection mount or other support surface, e.g., detect unexpected movement that may occur due to variations in the path, such as a pothole in the street or a sharp turn that the vehicle carrying the projector travels around.

The projected content may be modified such that the content may appear uniform or otherwise not be impacted by variations in distance to the projector across the projection surface, e.g., as the projection locations change. For example, the brightness of pixels of the projection surface physically closer to the projector may be darkened so as to appear to be the same overall brightness as other pixels positioned further from the projector, which without correction (due to the distance difference) would appear less bright than the closer pixels. It should be noted that "uniform" may not mean an overall uniform brightness if a different creative characteristic is desired (e.g., inconsistent brightness), but rather is meant to describe adjustments that calibrate or modify the input content to take into account the variable position of the projector relative to the projection location, e.g., scale to account for the brightness changes due to changes in position. In various examples, the system processes in real-time projection content that appears to emanate from a fixed or otherwise stable projection source, despite the projector being in an arbitrary momentary position and orientation. Additionally, the system can make macro adjustments related to the positioning of the content based on the projection surface features and orientation of the projector, micro adjustments to the content, such as on the per pixel level (e.g., intensity or hue) in light of surface features or material properties of the projection surface, and/or semantic adjustments for the viewing experience.

Figure 1A:
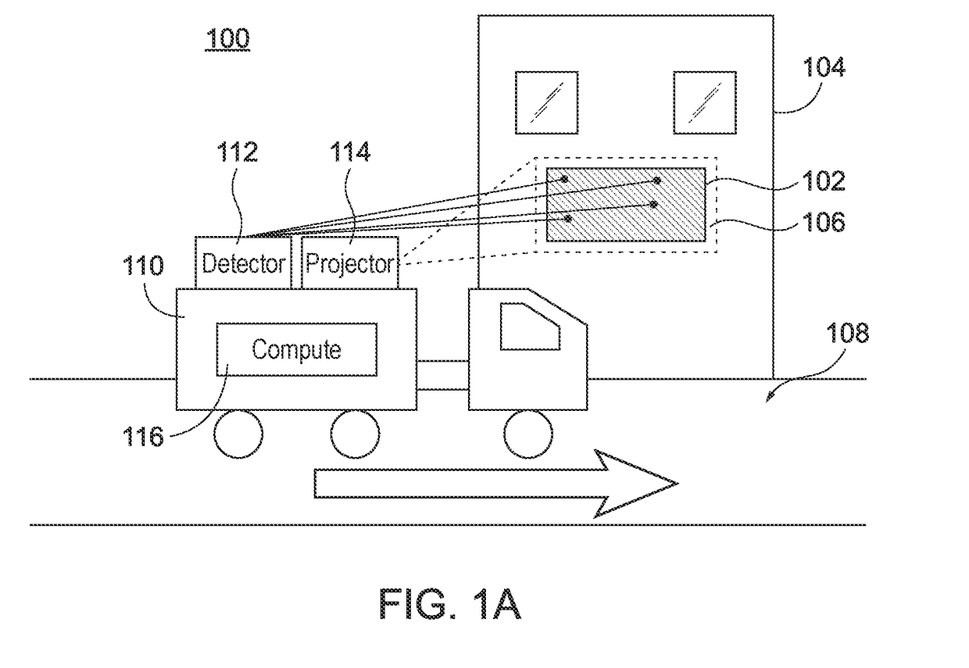
FIG. 1A illustrates a projection system for projecting content from a moving vehicle.

FIG. 1A illustrates an example of a projection system 100 for projecting content via a moving projector. The projection system 100 is configured to project content 102 onto an object 104 at a projection surface 106. The object 104 may be generally any type of object with at least one surface that may be suitable for projecting content thereon. Examples of the object 104 may include, but are not limited to, buildings, structures, vehicles, screens, statues, three-dimensional items, structural elements, vegetation, rocks, environmental components (e.g., fields, landscapes, etc.), and so on. In many instances, the object 104 will be positioned along a path 108 that the projection system 100 or parts thereof may travel along, e.g., buildings or billboards positioned along a road. The object 104 may be stationary, such as a building or structure, or may be movable, such as a vehicle (e.g., parade float, drone or other aircraft, boat). The object 104 may include a projection surface 106, which may be defined as a location on the object 104 where content 102 is selected to be projected. The projection surface 106 may be formed on a face of the object 104 and in some embodiments may be defined as the entire object 104 or a portion of the object 104. For example, for some content 102, the projection surface 106 may be defined as multiple faces of the object 104, such as for content 102 configured to be projected on a 3D surface. In other examples, the content 102 may be configured for projection a two-dimensional (2D) surface and in the projection surface 106 may be defined as a portion of the object 104.

The object 104 and projection surface 106 may change through projection of the content 102, such that the content 102 is configured to be projected at different projection surfaces 106, either on the same or different objects 104, as the projection system 100 (e.g., projector 114) changes in location. For example, as the projection system 100 moves along the path 108 or moves arbitrarily, the projection system 100 projects the content 102 at different locations, either on the same object 104 or on different objects. The projection system 100 may be configured to project the content 102 on a first object 104 until a threshold, such as a minimum number of projection pixels projectable by the projection system 100, is passed, and then the projection may move to another projection surface 106 or stop projecting content 102. In this manner, the system 100 may have a desired resolution for projection, where the threshold may be based on the resolution for the content. In some embodiments, the threshold may be based on a projection angle defined between the projector 114 and the projection surface 106.

The content 102 is generally any type of image data that can be displayed or formed on a surface for display. For example, the content 102 may include still images, series of images (e.g., multiple image frames), multiple images, movies, or the like. The content 102 may be synchronized with other content, e.g., audio, or may be standalone. For example, the content 102 may be synchronized with audio output sources (either on the support structure 110 or located in other positions, such as adjacent vehicles, or along the travel path) and/or may be synchronized with other effects, such as lighting effects, smoke effects, or the like. In this manner, the system 100 may communicate data corresponding to the projection of the content to synchronization systems or may communicate directly to peripheral devices, such as speakers.

Figure 1B:
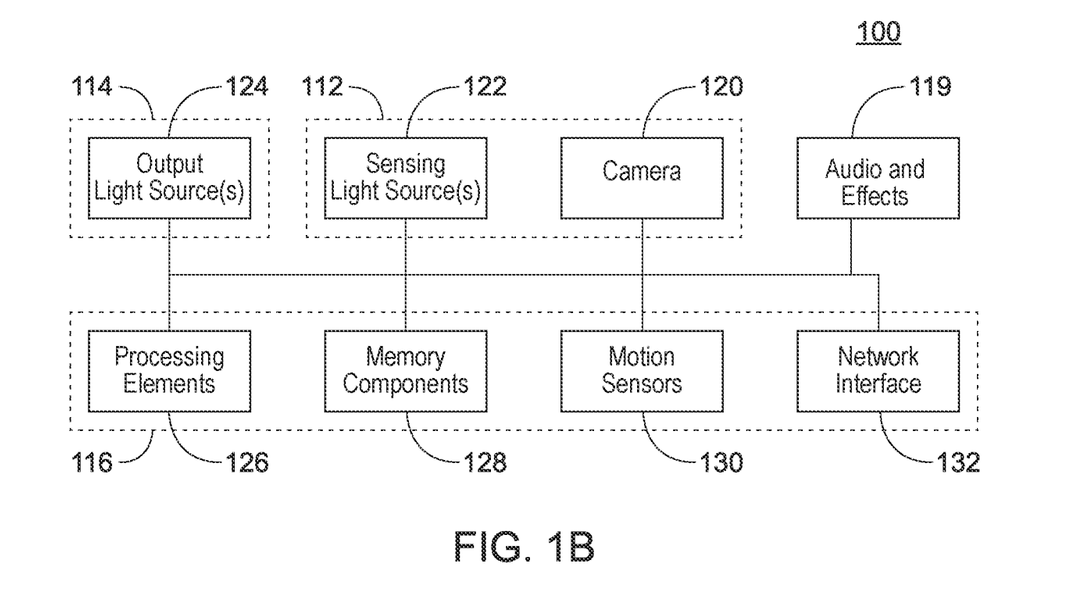
FIG. 1B illustrates a simplified block diagram of the projection system of FIG. 1A.

FIG. 1B illustrates a simplified block diagram of the projection system 100. With reference to FIGS. 1A and 1B, the projection system 100 may include a support structure 110, such as a vehicle or other movable component, a projector 114, a detector 112, and a computer 116. In some instances, the various components (e.g., projector, detector, and computer) may be integrated as a single component and in other instances, may be discrete components that may be in communication (directly or indirectly) with one another. Additionally, the various components may have functionality that may overlap with one another, e.g., the projector and detector may include processing elements that may perform some functions for the system 100.

The support structure 110 or vehicle 110 may be configured to move the projector 114 and detector 112 to different physical locations. The support structure 110 may be a vehicle, such as an automobile (e.g., car, truck, van), a trailer towed or otherwise pulled by a vehicle, an aircraft (e.g., unmanned aerial vehicle or drone), boat or barge, crane, train, or other element that can be moved to different positions or locations. In some embodiments, the support structure 110 may include a motor or other motion module that enables the motion or movement of the support structure 110. In these embodiments, the motor may be coupled to the computer 116 to provide inputs to the computer 116 to assist in the projection of the content 102. For example, the speed of the support structure 110 may be provided to the computer 116 to assist in modifying the content 102 for projection and identifying next projection locations.

The detector 112 is configured to detect characteristics of objects and the environment for projection, such as to identify an object 104 for projection of the content 102. For example, the detector 112 may function as a laser rangefinder or laser telemeter that utilizes a laser beam or other sensing source (e.g., sound) to determine a distance to the object 104. In other examples, the detector 112 may be any type of device that may remote sense surface features, e.g., photometer, glossmeter, spectrophotometer, event based camera, or the like. The detector 112 may include a camera 120 that may capture images of the environment and object 104. The camera 120 may be configured to capture wavelengths that are both visible and invisible to the human eye. For example, the camera 120 may capture infrared wavelengths in addition to or instead of visible wavelengths. The camera 120 may include one or more image sensors configured to generate a signal in response to received light information. In some embodiments, the camera 120 may be configured to capture light data corresponding to a sensing light source(s) 122 of the detector 112.

The light source 122 of the detector 112 may include one or more light generating elements and/or collimator or focusing lens elements. For example, the light source 122 may be configured to emit one or more laser beams that reflect from the object 104. The detector 112 may utilize reflectance information, such as a time of flight for the light to reflect from the object 104 and return to the camera 120, to estimate the distance from the detector 112 to the object 104. In other examples, different types of light and sensing modalities may be used. The light source 122 may emit light that is visible or invisible to the human eye, e.g., infrared or visible light spectrums. In one example, the light source 122 may emit a plurality of laser beams, e.g., four beams, that may be emitted from different light sources that are spatially separated and/or are time separated. In other examples, the light source 122 may emit structured light patterns that reflect on the object 104, where the light source 122 may or may not be collimated. The light source 122 may also include an integrated lens or may be configured to direct light through a lens associated with the projector 114.

With reference to FIG. 1B, the projector 114 may include one or more output light sources 124. The output light source 124 is configured to generate light that when reflected from the projection surface 106 of the object 104 forms the content 102. For example, the output light source 124 may be one or more lights configured to emit light visible to the human eye and include multiple colors as to form images on the object 104. The output light source 124 may be configured to emit various types of light as desired by the content creator for the content 102.

Optionally, the system 100 may include or be in communication with additional output or effect sources, such as audio speakers, special effects triggers, or the like. In this manner, audio and other effects can be synchronized with the content projection to enhance the viewer experience. For example, the system 100 can generate commands to dim lighting ahead of the support structure 110 entering into an area to enhance the visibility of the projected content in the viewing environment. As another example, the system 100 may relay position information to active/deactivate different speakers based on the location of the projected content, e.g., the sound may update output location as the projected content moves.

The system 100 may also include one or more compute elements, such as computer 116. It should be noted that certain aspects of the computer 116 may be spread across the projector 114 and/or detector 112. For example, the projector 114 may include one or more processing elements, memory components, or the like that enable the projector 114 to execute some of the functionality of the computer 116. Similarly, the detector 112 may include a processing element and/or memory components and perform functionality that may overlap with or be separate from the functionality provided by the computer 116. As such, the discussion of any particular functionality for the system 100 should understood as being performed by one or more of the components of the system 100. The computer 116 may include one or more processing elements 126, memory components 128, motion sensors 130, and a network interface 132, each of which may be in communication with the other components, such as via one or more system buses, wireless connections, on-board connections, or the like.

The processing elements 126 may be substantially any type of electronic device capable of processing, receiving, and/or transmitting instructions. For example, the one or more processing elements 128 may be a microprocessor, graphical processing unit, central processing unit, and/or a microcomputer. Additionally, the one or more processing elements 128 may include a first processor for controlling a first set of components and a second processor for controlling a second set of components, where the first and second processors may or may not be in communication with one another.

The memory components 128 may store processing logic used for operating the processing elements 126, as well as the content 102 for projection on the object 104, and/or patterns and information for the detector 112 and projector 114. The memory components 128 or storage devices may store electronic data, content, such as image files, video files, data, and so on. The memory components 128 may be, for example, non-transitory, such as non-volatile storage, a magnetic storage medium, optical storage medium, magneto-optical storage medium, read only memory, random access memory, erasable programmable memory, flash memory, and/or a combination of one or more types of memory. Also, it should be noted that the memory components 128 may be distributed across a network and/or system components.

The network interface 132 receives and transmits data from the various system components to the computer 116. The network interface 132 or input/output module may transmit data between the detector 112 and projector 114, as well as optionally between one or more user devices or processing elements at other locations, such as via a network (e.g., Wi-Fi).

Figure 2:
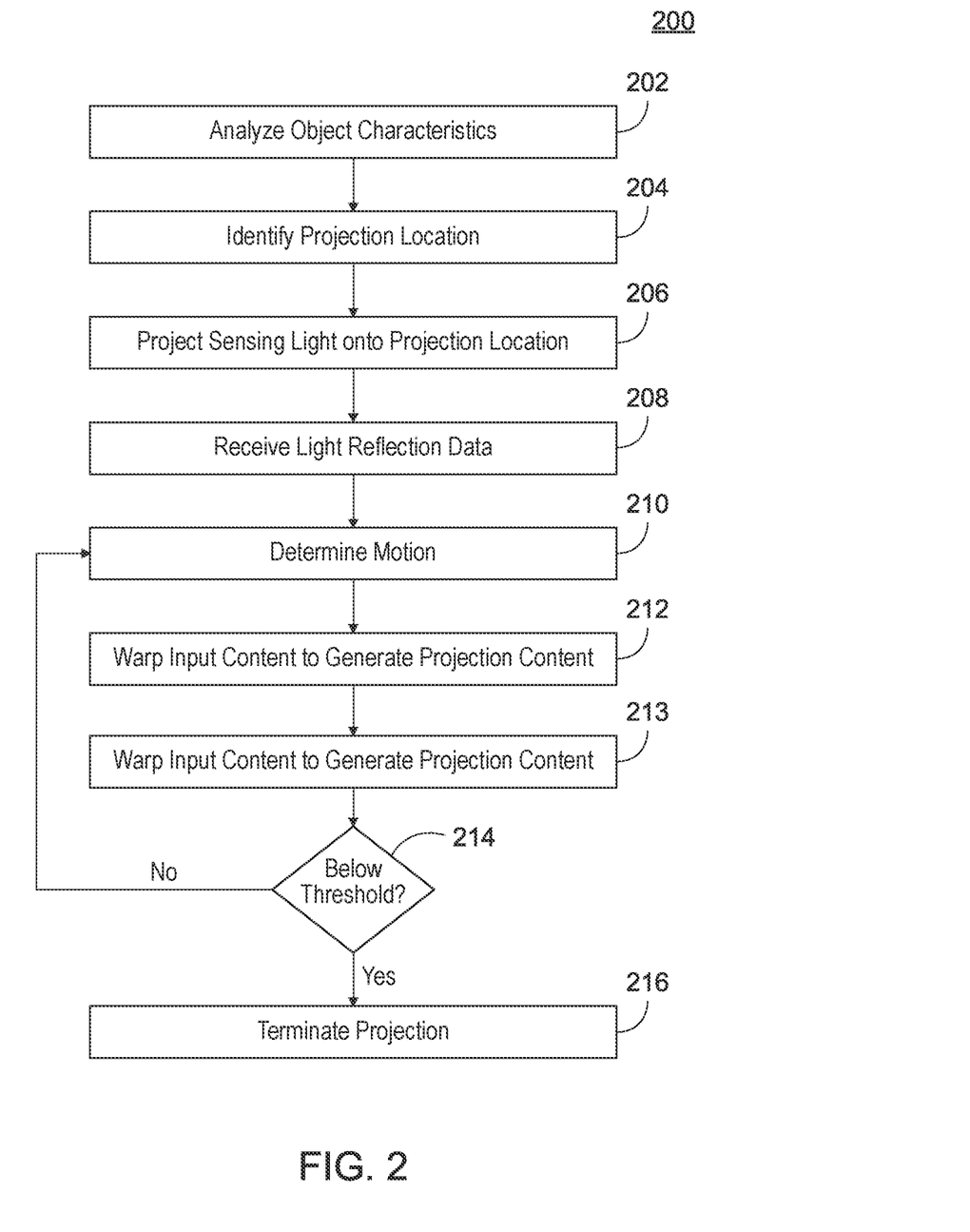
FIG. 2 is a flow chart illustrating a projection method.

With reference to FIG. 2, in some examples, the system 100 may also include one or more motion sensors 130. The motion sensors 130 may be configured to receive or detect data corresponding to the movement of the vehicle 110 and/or projector 114. For example, the motion sensors 130 may be configured to determine a speed or acceleration of the projector 114 along various axes. The motion sensors 130 may include, an inertial measurement unit, accelerometers, gyroscopes, or the like. In some embodiments, the motion sensors 130 may be coupled with the support structure 110 and receive information from the vehicle, such as, but not limited to, speed, direction, and the like. In this manner, the motion sensors 130 may be configured to detect motion of the projector 114 both separately and/or together with the vehicle 110. This allows the system 100 to update the content 120 projection characteristics based on the position and movement of the projector 114, where the movement may be arbitrary or planned or a combination thereof (e.g., the support structure 110 may hit a pothole while traveling along a preplanned route).

FIG. 2 illustrates a method 200 to generate content 102 for projection on the projection 106 of the object 104. The method 200 may include operation 202 characteristics of the object 104 are analyzed by the processing elements 126 of the computer 116. For example, the detector 112 may capture one or more images of objects 104 within an environment, such as along a predetermined path, within a theme park, in a particular geographical location, or in other locations where the content is desired to be projected. The images may be analyzed to determine projection surfaces on one or more objects 104, such as identifying areas of relatively smooth or plain surface texture, sufficient wall space or blank areas for the content 102, as well as other parameters that may be desired for the artistic output for the content 102. For example, the processing element may use computer vision techniques to map objects 104 to identify smooth surface information, size information, or like, and analyze pixels of the images captured by the detector 112. Other techniques, such as Light Detection and Ranging (LIDAR), glossmeter, spectrometer, event camera, or other remote sensing modalities could be used as well to determine object characteristics of the objects 104.

In some instances the projection surface may move. When a projection surface is moving systems similar to motion sensors 130 may be coupled to the moving projection surface and their output coupled to subsequent processes in a manner similar to that described for sensor 130. Alternatively, relative motion between the projector and projection surface can be measured optically by comparing the changing geometry of features in images captured of a scene including the projection surface. This may be particularly useful when both the projector and projection surface are moving.

Figure 3:
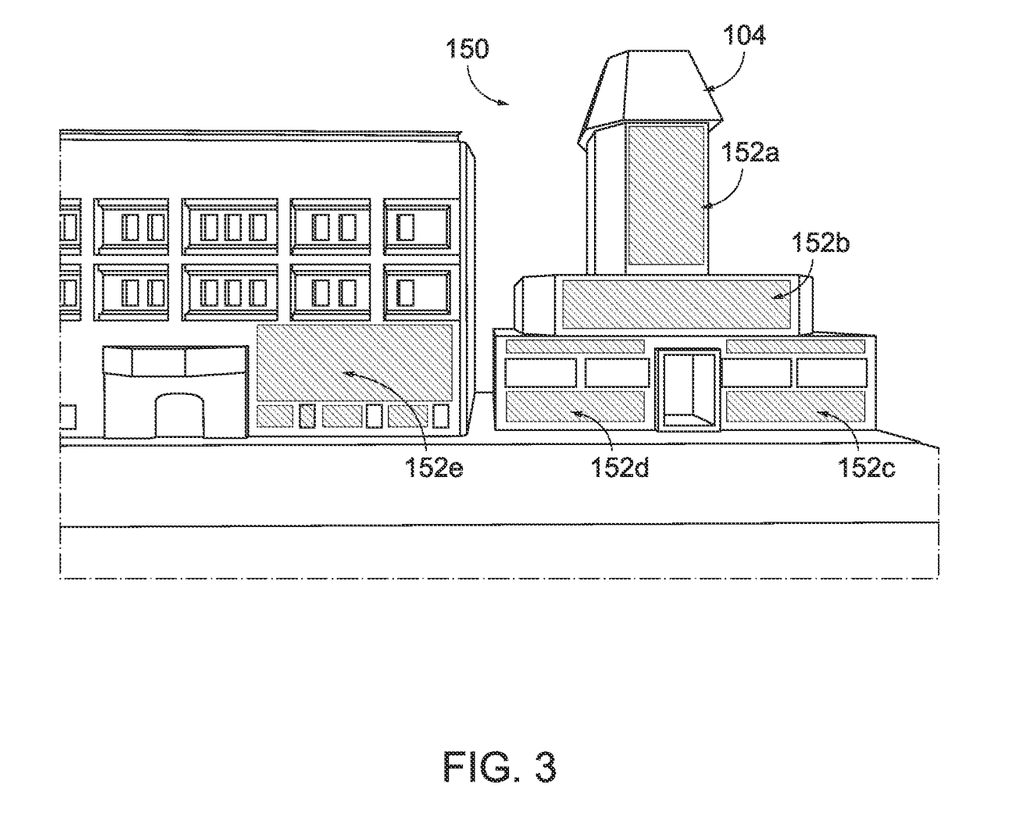
FIG. 3 illustrates an identification of projection surfaces by the system of FIG. 1A.

FIG. 3 illustrates an example of an environment 150 with multiple possible projection locations 152a-152e identified on objects 104. As shown in FIG. 3, the characteristics of the different objects 104, which in this example are building facades, are used to define the bounds of different projection surface options 152a-152e. The different projection surface objects 152a-152e may be defined as locations on the building facades or other surfaces that may be relatively smooth or have relatively planar surface, e.g., space between architectural openings, such as windows, doorways, and the like. In these examples, surface texture, such as due to the building material surfaces (e.g., brick, stucco, concrete, etc.) may not be considered to be "textured" with respect to the identified surface. Rather, large variations from a plane, such as architectural openings, may be defined as textured or non-smooth areas. For example, micro textures (e.g., roughness), macro textures (e.g., material types), and/or semantic features (e.g., surface type, such as window, wall, etc.) may be determined and used to assess the projection surface options. The features and textures analyzed may be variable based on the type of content to be projected and so the system 100 may be configured to identify one or more categories of textures and features, and select certain options depending on the values for the texture category or feature, where the options vary based on the content.

In some embodiments, the objects 104 may be analyzed to determine color or patterns on the surfaces, such that the projection surface or location options 152a-152e may be those surfaces with neutral or single coloring. In many embodiments, the analyze may identify features 155a-144d on the object 104 (see FIG. 4). In some embodiments, reflectance features may be evaluated with the other characteristics analyzed, e.g., a window with the shades open may have a reflectance value that is undesirable for certain content, but a window with the shades drawn or closed may have a reflectance value that satisfies requirements of the content.

With reference again to FIG. 2, by analyzing the object 104 characteristics, the method 200 then in operation 204 identifies a projection surface for an initial projection. For example, the processing element 126 may select a preferred or best fit projection surface 152a-152e for projection of the content 102. In other examples, an artificial intelligence (AI) or machine learning (ML) platform may be trained based on suitable projection surfaces and used to select a projection surface from a plurality of options. The selection may be based on characteristics of the content 102, such as aspect ratio, coloring, size, brightness, or the like, as well as characteristics of the projection surfaces. For example, certain projection areas, such as projection surfaces 152c and 152d may be discarded due to the interruption of the projection surface with non-planar features, e.g., windows, doors, trim. Other projection surfaces 152a, 152b may be discarded due to the size or constraints not matching the aspect ratio of the content 102. In yet other examples, certain projection surfaces may include coloring or patterns that may be undesirable for the content 102 and may be discarded. In some instances, a best fit analysis may be used to identify a suitable projection surface. In other examples, different assessments may be used to identify the selected projection surface.

It should be noted that operations 202 and 204 may be performed in real-time as the projector 114 is being moved by the support structure 110 and preparing to project content onto an object 104. In other examples, operations 202 and 204 may be done ahead of projection, e.g., the projection surfaces 106 for any given object 104 may be mapped out ahead of the movement of the projector 114. In other embodiments, a high resolution scan of the projection surfaces 106 may be done ahead of projection and during projection and movement a lower resolution, but faster computational method may be done, where the real-time information is used with the earlier high resolution information to determine a projection surface.

Figure 4:
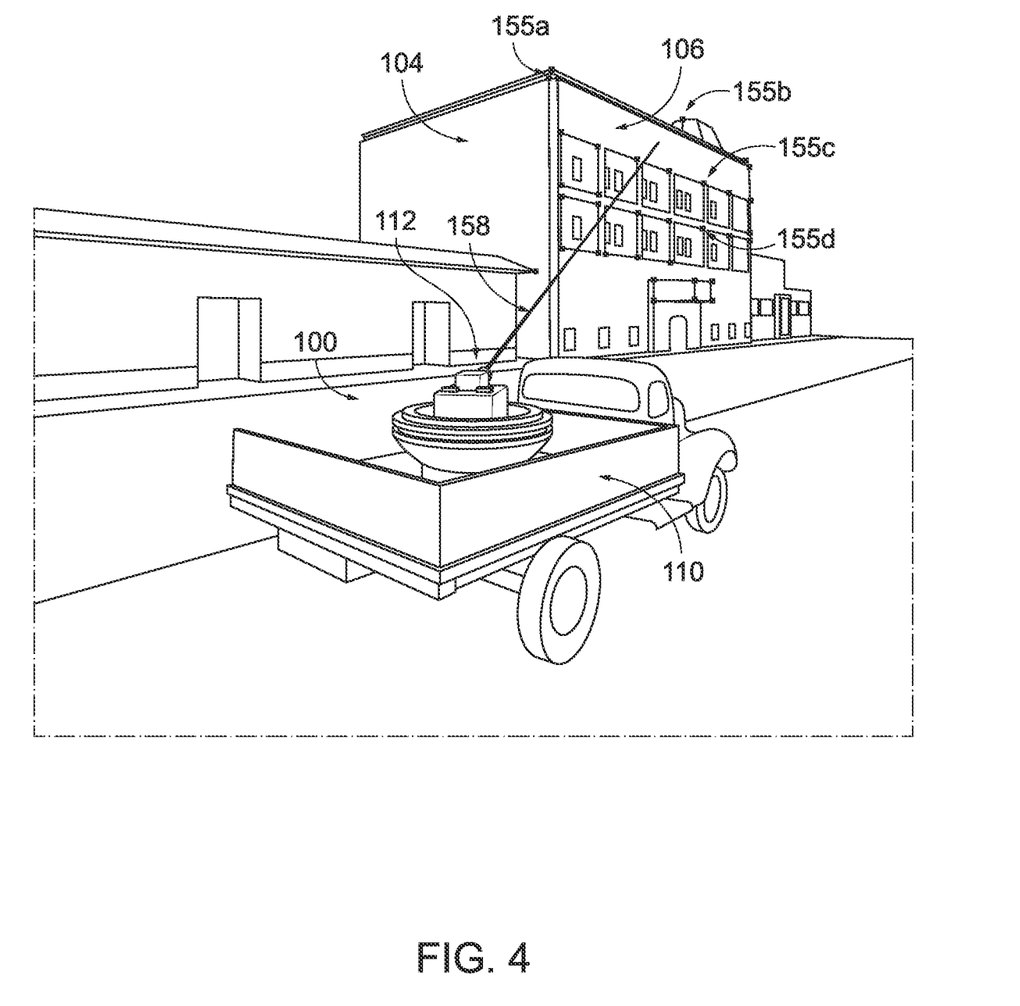
FIG. 4 illustrates utilizing a detector to identify and analyze projection surfaces.

In operation 206, the method 200 may project sensing light 158 from the sensing light sources 122 onto the projection surface 106. In one example, the detector 112 may emit four laser beams that reflect from the projection surface 106. FIG. 4 illustrates an example of the sensing light 158 projected onto a projection surface 106 on object 104. As shown in FIG. 4, the features 155a-155d of the object 104 (e.g., architectural features, non-planar feature characteristics, etc.), may be identified by the processing element 126 and the sensing light 158 may be directed at the projection surface 106 that is relatively free from such features 155a-155d.

Figure 5A:
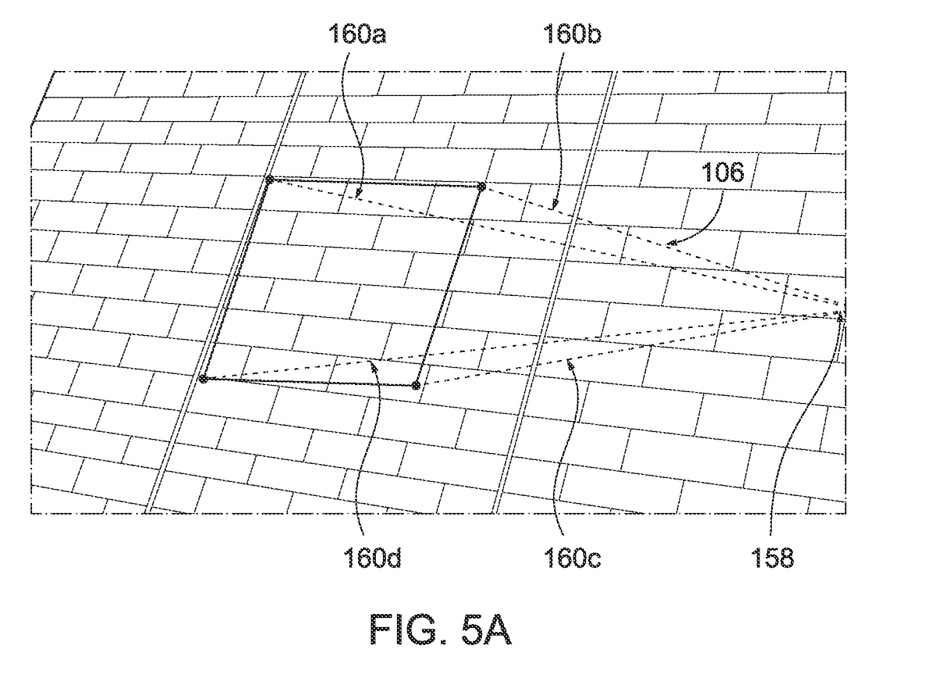
FIG. 5A illustrates a surface orientation detection utilizing a light source.
Figure 5B:
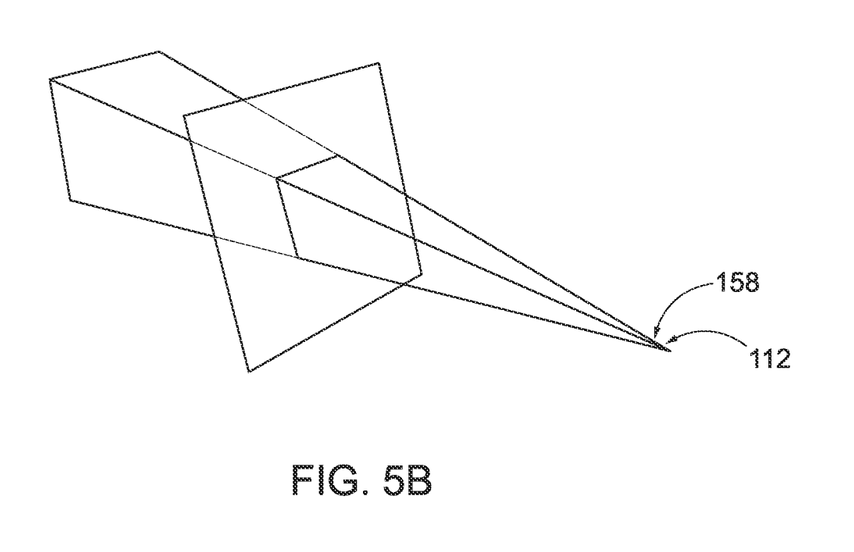
FIG. 5B illustrates features of the light source utilized in FIG. 5A.

FIG. 5A illustrates an enlarged view of the projection surface 106 with the sensing light 158 projected thereon. FIG. 5B illustrates a simplified view of the sensing light 128 as extending from the detector 112 to reach the projection location 106. As shown in FIG. 5A, the sensing light 158 may include four separate beams 160a-160d that may be projected at different angles, such that the four beams 160a-160d may reflect at different spatial locations on the projection surface 106.

With reference again to FIG. 2, in operation 208, the method 200 may then include receiving the light reflection data at the detector 112. For example, the camera 120 may capture one or more images of the projection surface 106 with the sensing light 158 being reflected off of the surface of the object 104. In some embodiments, the camera 120 may include a filter, such as a bandpass filter, that filters out light other than the wavelength of the sensing light 158, such that only the end points of the sensing light 158 as reflected from the projection location 106 may be visible. In other embodiments, the processing elements may utilize a filter or other image analysis technique to identify the end points of the sensing light 158.

With reference again to FIG. 2, the method 200 may determine motion of the projector 114 based on the light reflection data. For example, the ends points of the sensing light 158 as captured may be analyzed in light of the known orientation angle of the beams 160a-160d when omitted from the detector 112. The points of the various beams can then be analyzed to determine how the angle between the ends is different from the origination angle. For example, the end points may be connected via lines, e.g., to form a square, and the angular offset of one or more sides of the square relative to the other sides can be used to determine the pose or orientation of the projection surface 106 relative to the detector 112. Multiple frames of the sensing light 158 reflecting from the projection location 106 may be analyzed and changes in the ends of the sensing light 158 across multiple images or frames is analyzed to determination motion of the detector 112, which may be used to determine the motion of the projector 114 (e.g., the motion of the detector 112 may be considered to be the same as the projector 114 when both are mounted to the same structure 110).

In addition to the sensing light 158 analysis, the system 100 may also utilize information from the motion sensors 130 to determine motion of the detector 112 and/or projector 114. In many instances, the motion of one component may be applied to the other, since the components may be integrated together or sufficiently close together on the support structure 110 to be evaluated together. For example, the motion sensors 130 could provide speed, altitude, and orientation of the system 100 relative the projection surface 106, which could be used with the reflection information (e.g., end points) to determine motion and orientation relative to the projection surface 106.

Figure 6A:
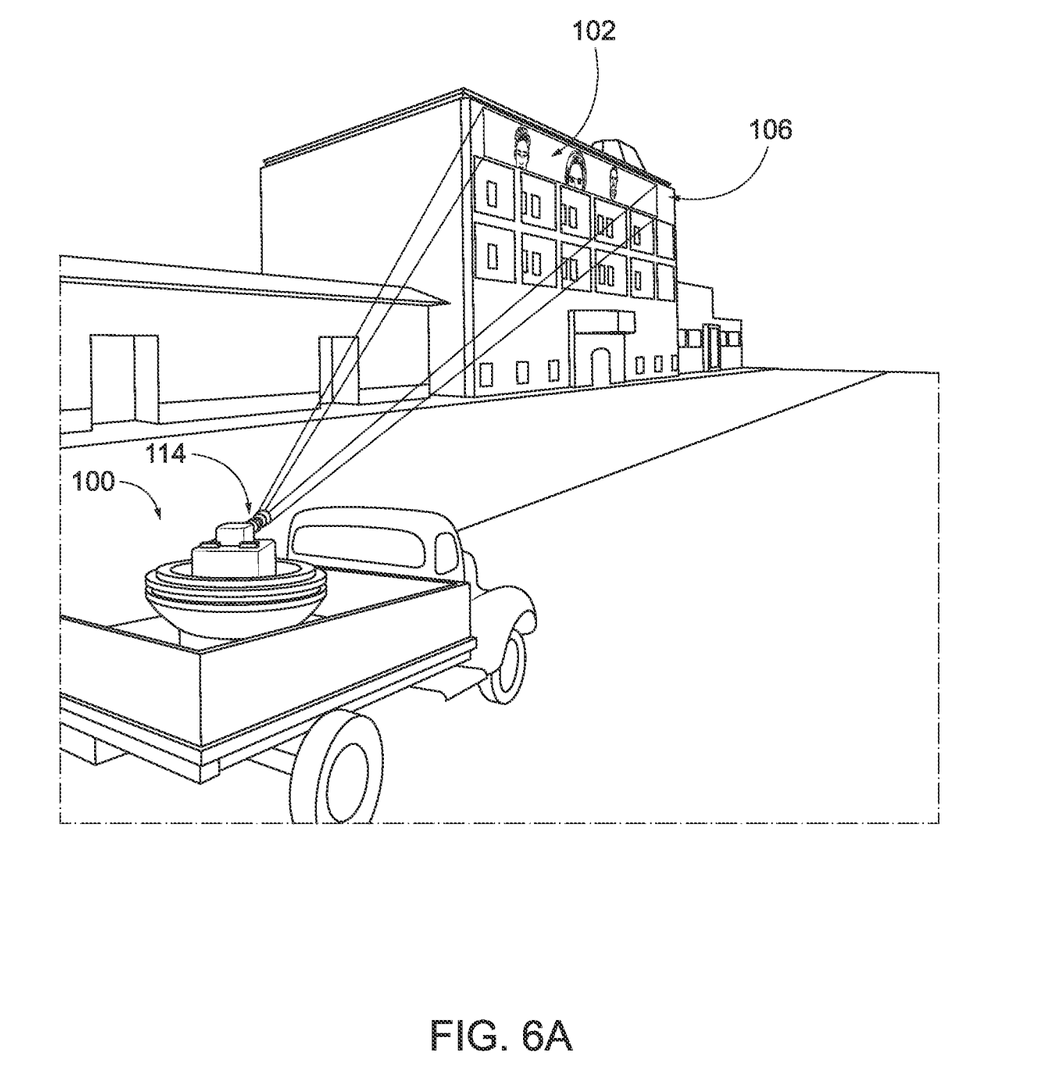
FIG. 6A illustrates content projected onto a projection surface at a first location of the projector.

In operation 212, an input content is modified to compensate for projection on the projection surface 106. For example, the content 102 may be varied, such as the dimensions increased or decreased, color corrected, brightness corrected, or the like, to account for the features of the projection surface 106 and the movement of the projector 114. FIG. 6 illustrates an example of the content 102 being projected onto the projection surface 106, where the content 102 at any given point in time is modified to account for the projection angle (e.g., the position of the projector 114 relative to the projection surface 106), as well as the features of the projection surface 106. The content 102 may be dynamically updated as the projector 114 continues to move relative to the projection surface 106 and/or as the projection surface 106 moves relative to the projector 114).

Figure 6B:
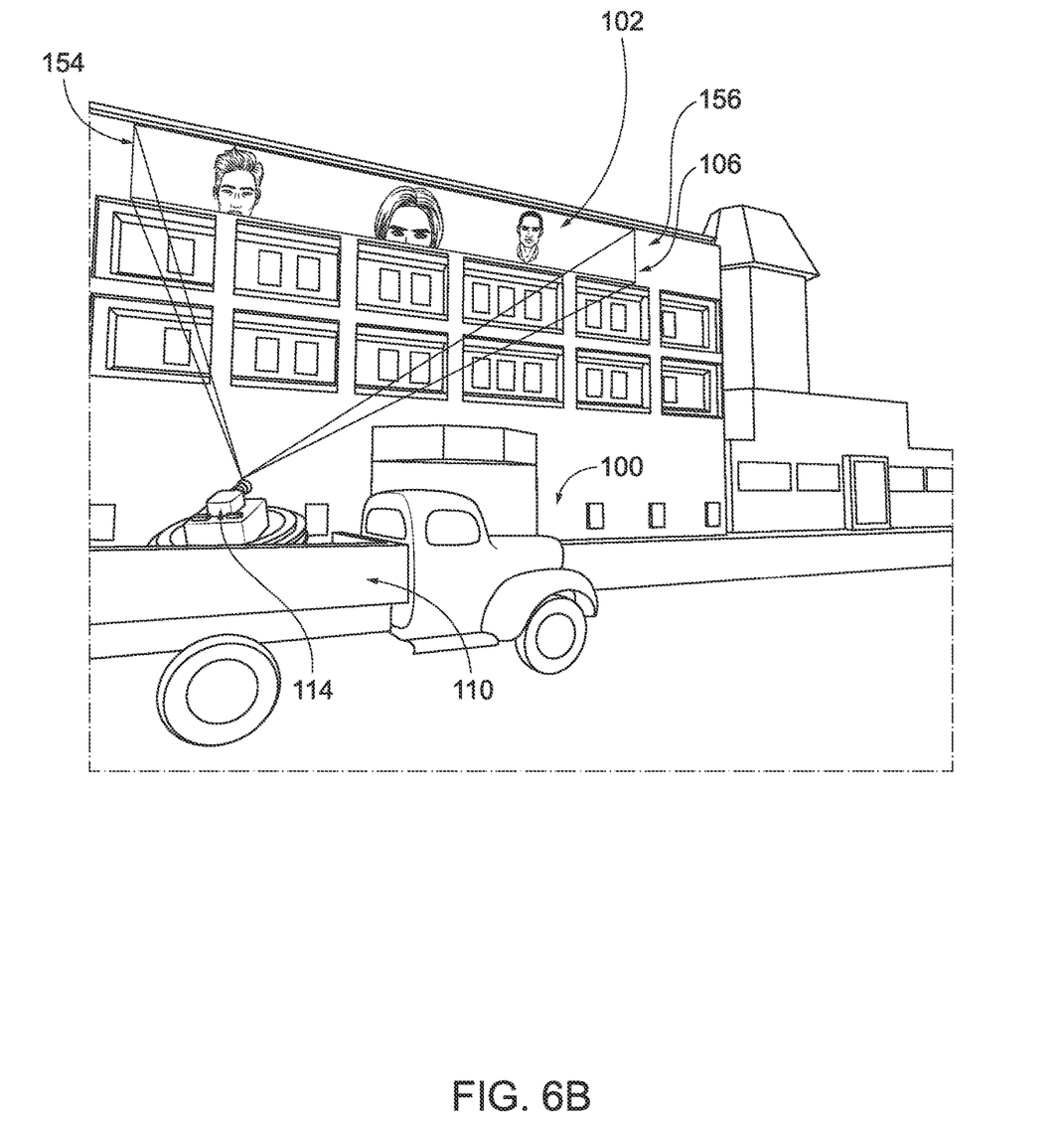
FIG. 6B illustrates content projected onto the projection surface at a second location of the projector.

As the content 102 is being projected, the system 100 may continuously update the motion assessments, such as repeat operation 110. For example, as shown in FIG. 6B, as the projector 114 continues to move relative to the projection surface 106, they system 100 may update the content 102 to account for the change in position. As an example, the brightness for pixels within the content 102 may be compensated, such as based on an inverse square rule function, such that pixels closest to the projector 114 may be dimmed so that the brightness is same as the brightness of pixels farthest from the projector 114. For example, the system 100 may modify the brightness of pixels in the left corner 154 of the content 102 such that they may appear the same as pixels in the right corner 156 of the content 102, which is further away from the projector 114. As the projector 114 continues to move closer to the right corner 156 of the projection surface 106, the brightness adjustment may scale accordingly, e.g., the left corner 154 pixels will adjust to become brighter and the right corner 156 pixels may adjust to be dimmed, such that the brightness scales relative to the position of the projector 114. As mentioned, in on some examples, this scaling or adjustment is based on the inverse square rule function and can be done to adjust not only for brightness, but also for other content characteristics, such as hue and intensity, that may be changed based on location and distance from the projector 114.

In some embodiments, the method 200 may include operation 213 and the system 100 may modify one or more characteristics of the projector based on the motion of the projector 114. For example, tilt, lens control, brightness, and the like, may be modify to adapt to the changing location of the projector 114 relative to the projection surface 106. Lens characteristics may also be modify, such as to change the projection frustum, in light of the position of the projector 114. It should be noted that the projection characteristics may be modified instead of or in conjunction with the content modifications in operation 212.

Figure 7:
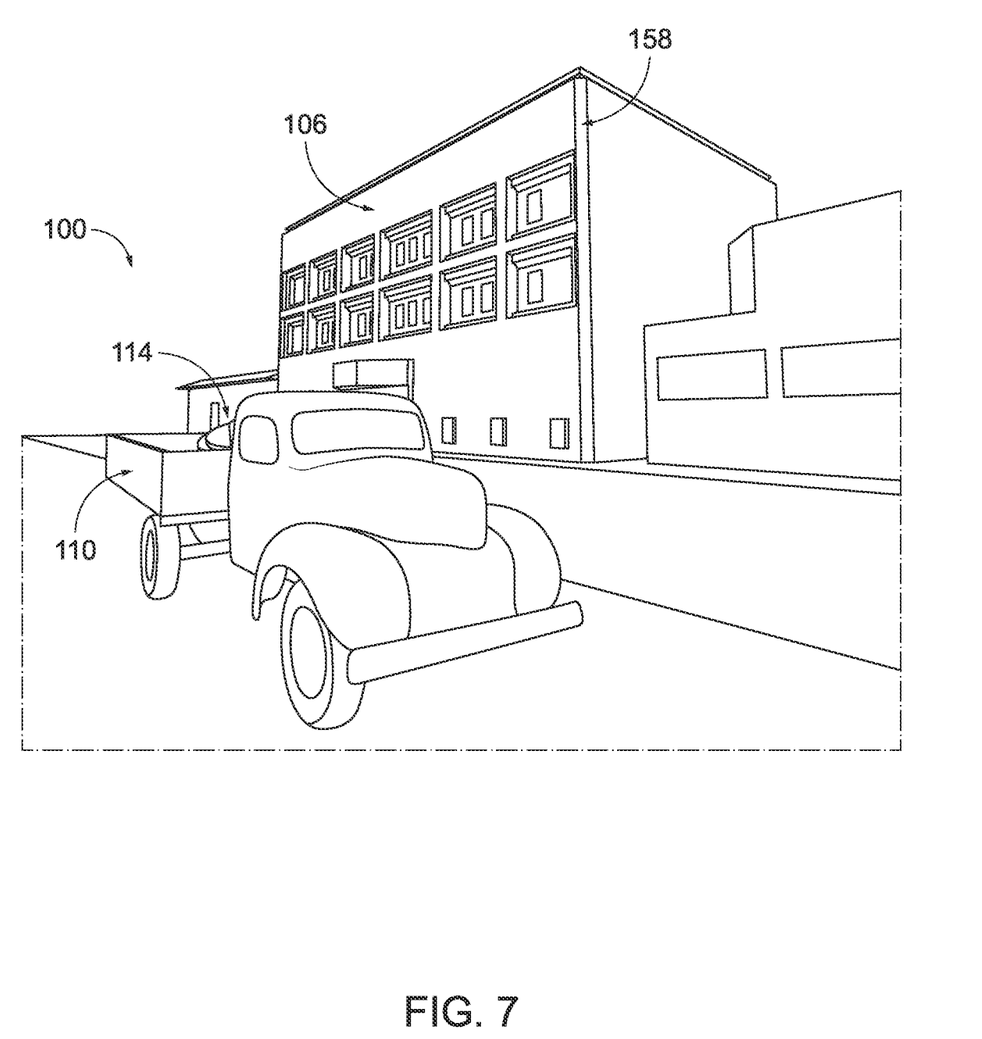
FIG. 7 illustrates the termination of content projected at a third location of the projector.

With reference again to FIG. 2, the method 200 may proceed to operation 214 and the system 100 may determine whether the projection has dropped below an optimized threshold. For example, the system 100 may analyze the angle between the projection surface 106 and the projector 114 (e.g., via operation 208), as well as the distance relative to the projector 114 and the projection surface 106, and other features, to determine whether the projection has become sub-optimal, e.g., below a desired resolution or scale for the content 102 (e.g., angle between the projector and the projection surface exceeded or reduced below a desired range). For example, as shown in FIG. 7, at a second position along the path 108, the original projection surface 106 may too small for projection of the content 102. In some embodiments, the detector 112 and operations 206 and 208 may be used to determine the projection angle. A new projection surface 158 may be identified, but this surface may be considered too small for the content 102 and/or have other less than ideal properties, such as an off aspect ratio, incorrect color, or the like. In other instances, the system 100 may determine whether stretching of the pixels for a particular position may impact the desired aesthetic of the content and therefore may determine that the projection has dropped below a threshold. The overall assessment of the threshold may be based on not just on a geometric angle, but also the pixel stretching, surface reflectance (e.g., a surface may reflect poorly at oblique or other angles), and/or the lens used for the projector.

When the characteristics of the projection drop below the threshold, the method 200 proceeds to operation 216 and the system 100 terminates projection. For example, the projector 114 may stop projecting content 102. The termination of projection helps to prevent "blowby" or other instances where the projection may be oriented towards an area that cannot form the image, such as into an empty space next to a building. The system 100 may then return to the operation 202 and identify a new location along the path 108 if desired. If in operation 214 the threshold has not been reached, the system 100 may continue to determine motion 210 and update the content 102 accordingly.

It should be noted that certain operations of the method 200 may be performed in parallel with one another. For example, as the content 102 is being projected, the system 100 may scan additional surfaces to identify the next projection surface for the content 102. In this manner, as soon as the threshold has been reached and the content 102 is stopped on a first projection surface, the system 100 may be ready to project content 102 on the next or second projection surface that is positioned at a second location from the first projection surface. In this manner, the content 102 may continuously adapt to the movement of the projector 114. Additionally, changes to the content may be made at the pixel level, such as individual adjustments to particular pixel characteristics (e.g., hue and intensity), and/or may be made across the image as a whole, such as a warping applied globally to the entire image frame.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method to project content comprising:
analyzing an object to identify a projection surface;
determining a first position of a projector relative to the projection surface;
modifying a first frame of a content for projection onto the projection surface based on the projection surface and the first position of the projector;
projecting the first frame of the content from the projector onto the projection surface;
determining a second position of the projector relative to the projection surface, wherein the second position is different from the first position;
modifying a second frame of the content based on the projection surface and the second position, wherein modifying the second frame comprises scaling a brightness of a plurality of pixels based on a distance change of the projector between the first position and the second position; and
projecting the second frame of the content from the projector onto the projection surface.

2. The method of claim 1, wherein the projection surface is formed on a building.

3. The method of claim 1, wherein the projector moves arbitrarily or along a predetermined path between the first position and the second position.

4. The method of claim 1, wherein the projector moved by a vehicle.

5. The method of claim 1, further comprising analyzing an angle between the projector and the projection surface to determine that the projection is within a desired range.

6. The method of claim 1, wherein determining the first position of the projector to the projection surface comprises:
projecting a sensing light onto the projection surface;
analyzing reflection data from the sensing light reflecting from the projection surface.

7. The method of claim 6, wherein the sensing light comprises a plurality of laser beams arranged to reflect at different locations on the projection surface.

8. The method of claim 6, wherein analyzing the object to identify a projection surface comprises:
analyzing a texture of the object; and
analyzing an approximate size of surfaces between one or more architectural openings of the object.

9. The method of claim 1, wherein the brightness is increased if the second position is farther from the projection surface than the first position and the brightness is decreased if the second position is closer to the projection surface than the second position.

10. A projection system comprising:
a vehicle;
a detector coupled to the vehicle such that movement of the vehicle moves the detector; and
a projector in electrical communication with the detector and coupled to the vehicle such that movement of the vehicle moves the projector; wherein
the detector analyzes objects within an environment to identify a first projection surface on a first object and a second projection surface on a second object and the projector projects content on the first projection surface from a first location of the vehicle;

the projector continues to project content on the first projection surface as the vehicle moves away from the first location towards a second location until a projection angle of the projector relative to the first projection surface drops below a threshold due to the movement of the vehicle from the first location towards the second location; and the projector projects content on the second projection surface from the second location of the vehicle.

11. The projection system of claim 10, wherein the vehicle moves arbitrarily between the first location and the second location.

12. The projection system of claim 10, wherein the content is modified to fit within the first projection surface for projection from the first location and modified to fit within the second projection surface for projection from the second location.

13. The projection system of claim 10, wherein the detector comprises a sensing light source to emit light towards the first object and the second object, wherein the sensing light is analyzed to determine the first projection surface and the second projection surface.

14. The projection system of claim 10, wherein the projector projects the content on the second projection surface after the projection angle of the projection relative to the first projection surface drops below the threshold.

15. The projection system of claim 10, wherein a brightness of a plurality of pixels of the content is adjusted based on a location of the plurality of pixels on the first projection surface relative to the projector.

16. The projection system of claim 10, wherein the vehicle comprises one or more of: a car, a truck, a trailer, an aircraft, a boat, or a train.

17. The system of claim 10, further comprising modifying at least one of a brightness, an intensity, or a hue of one or more pixels of the content as projected on the first projection surface inversely based on a distance change of the projector relative to the first projection surface.

18. A method to project content along a path comprising:
identifying a first projection surface at a first location on the path;
identifying a second projection surface at a second location on the path;
projecting content onto the first projection surface from a first plurality of positions of a projector moving on the path;
reaching a projection threshold for the first projection surface based on a position of the projector on the path relative to the first location, wherein the projection threshold is a projection angle of a projection distance relative to the projector and the first projection surface and the projection threshold is reached due to movement of the projector on the path; and
projecting content onto the second projection surface from a second plurality of positions of the projector moving on the path.

* * * * *